March 12, 1963  G. J. MAURIZI ETAL  3,080,639
METHOD FOR PRODUCING WINDOWS IN CAGES OF ROLLER BEARINGS
Filed Nov. 19, 1959  2 Sheets-Sheet 1
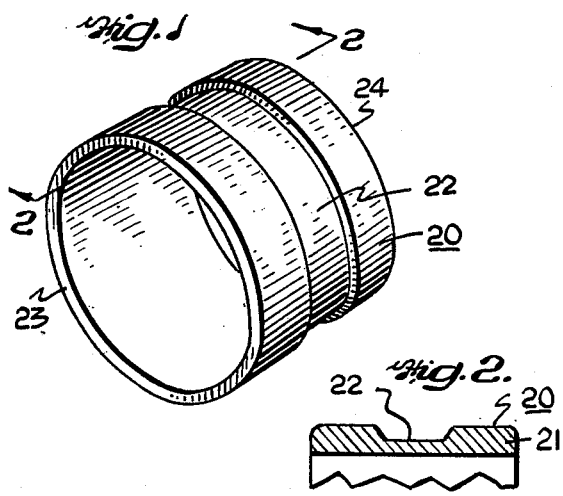
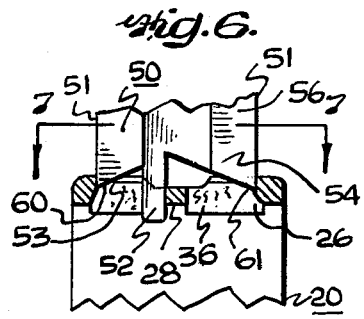
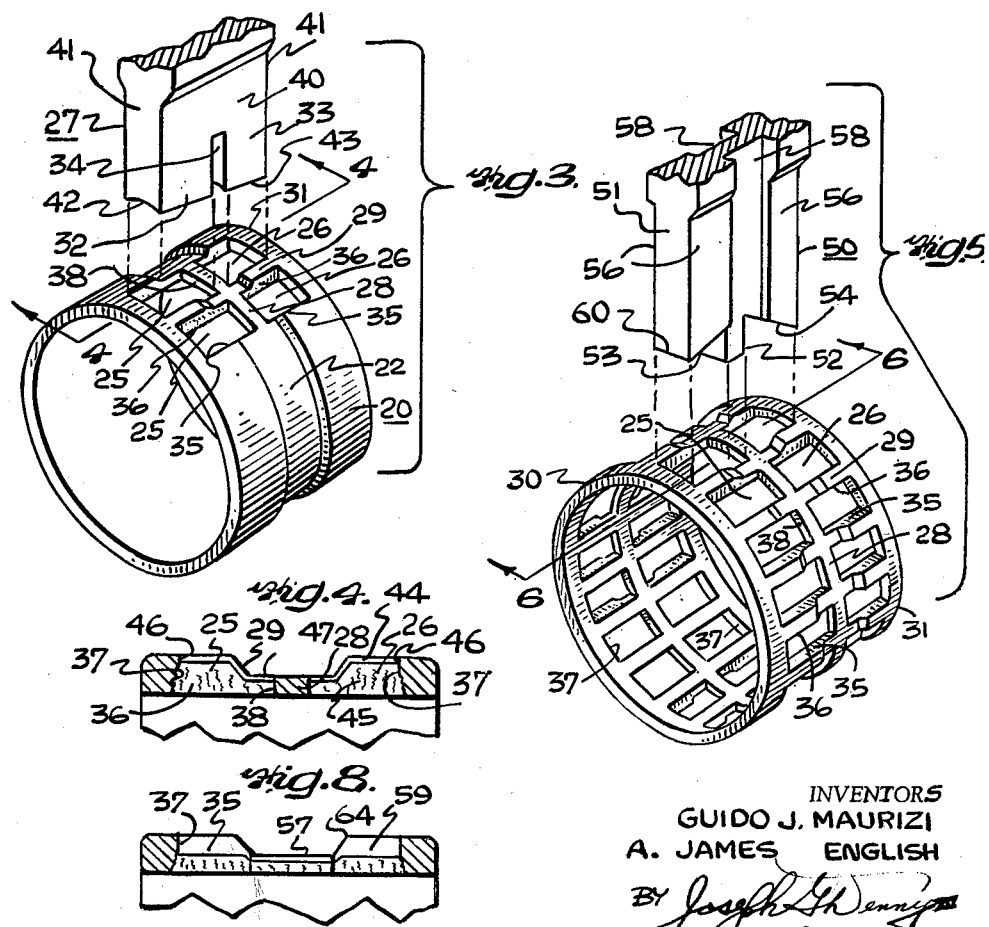
INVENTORS
GUIDO J. MAURIZI
A. JAMES ENGLISH
BY Joseph L. Wenny
THEIR ATTORNEY

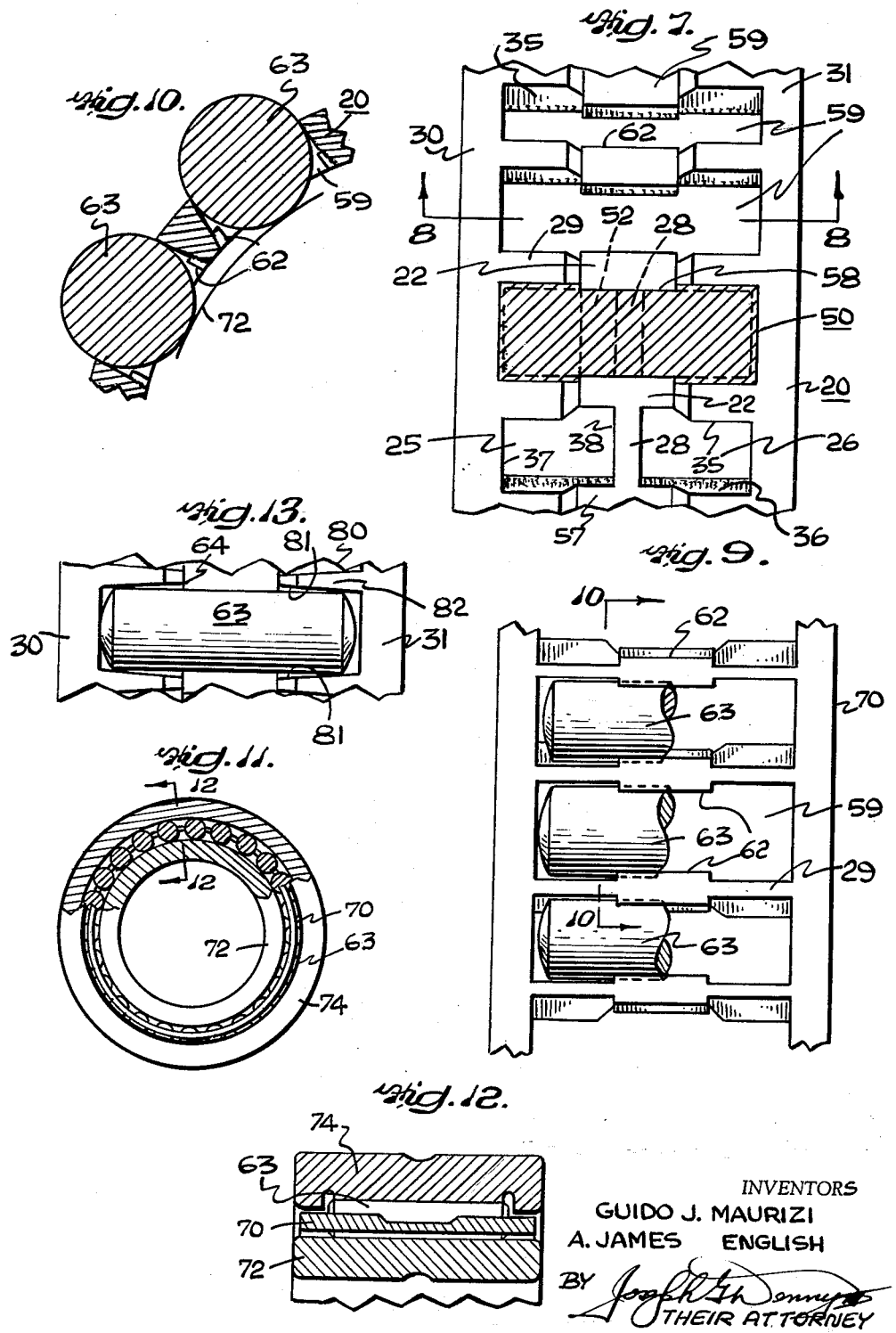

United States Patent Office 3,080,639
Patented Mar. 12, 1963

3,080,639
METHOD FOR PRODUCING WINDOWS IN CAGES OF ROLLER BEARINGS
Guido John Maurizi, Trenton, and Albert James English, Windsor, N.J., assignors to Roller Bearing Company of America, Trenton, N.J., a corporation of New Jersey
Filed Nov. 19, 1959, Ser. No. 854,090
8 Claims. (Cl. 29—148.4)

This invention relates to an improved method of forming windows in the cages of roller bearings, particularly those in which cylindrical rollers are guided by the bars of the cages.

In roller bearings using relatively thin walled cages, the cages are frequently formed from cut lengths of tubing and are provided with windows, sometimes known as pockets or slots, which receive and hold the rollers. The bars partly defining the windows of the cages guide the rollers in their epicycloidal movement about the axis of the bearing. Heretofore, when the cages have been produced from cut lengths of tubing, the windows have usually been formed therein by mounting the cage on a fixture, striking the cage with a parallel-sided punch, and indexing the cage on the fixture to sequentially cut successive windows during each pause in the index movement.

The formation of the windows in this manner has not been wholly satisfactory as the bars between the windows tend to twist and bow in the cutting operation by reason of the fact that the amount of peripheral tube material on each side of the window to be formed is not comparable except when forming the first and last windows. That is to say, when punching out the first window equal amounts of peripheral tube material are present on both sides of the punch. However, when forming the second window the amount of peripheral material on the side of the punch adjacent the first window is only the relatively thin bar to be left between the first window and the second window whereas on the opposite side of the punch there is a wall of material extending in depth almost completely about the cage. Thus, when the punch descends to cut the tube so as to form the second window, there is a tendency for the tubular material that is to form the first complete bar to bow away from the punch and into the opening of the first window and, at the same time, to twist in the direction of the movement of the punch, particularly at the center of the bar. However, there is no corresponding tendency at such time on the part of the tube material that is to form the second bar (the bar between the second and third windows) to bow and twist as it is backed up by a depth of nearly 360° of tubular material.

We have found that the outer or upper edge of the last formed face of the first bar is nearer to the longitudinal axis of the cage than the corresponding edge on the first formed face of the second bar, particularly in the area remote from the ends of the bar; that the last formed face of the first bar is not flat but bows into the opening of the second window, particularly in the area remote from the ends of the bar; and that the inner or lower edge of the last formed face of the first bar is, generally, nearer to the longitudinal axis of the cage than the corresponding edge of the first formed face of the second bar, particularly in the area remote from the ends of the bar. Each subsequently formed window, other than the last, also results in the formation of one face of a bar that is bowed and twisted relatively to the first formed face of the next succeeding bar as the depth of "back up" material on opposite sides of the punch differs radically.

The last window formed presents the same depth of "back up" peripheral material to both sides of the punch and, therefore, the tendency to bow and twist in the last bar formed and next to the last bar formed will be equal Thus, the two faces of the last window are similar. That is to say, after removal of the punch both faces are bowed into the last window and both are twisted.

Clearly, when windows are formed sequentially with but a single blow of a punch, three sized windows are produced. The first window will have the greatest clearance or opening and the last window to be formed will have the narrowest opening.

The bowing in of the bars of the windows tends to pinch the rollers and provides contact with the rollers at objectionable areas, viz., along the center sections rather than adjacent the corners of the windows. When the rollers are pinched by the bars either continuously or intermittently, the rollers are cut or galled resulting in shortened roller life.

It is a primary object of this invention to provide a method of forming cage windows with guiding but nonpinching sides throughout their lengths.

It is a further object of this invention to provide a method of forming windows having parallel guiding edges adjacent the ends of the windows.

In the preferred embodiment of this invention, the wall thickness of the central section of a piece of tubing of cage width is substantially reduced by a lathe or other suitable means. Thereupon the windows are formed in the tube in a two step operation by means of two punches or cutting tools. The first cutting tool punches a plurality of side by side rectangular openings about the periphery of the tube and adjacent the edges thereof leaving a relatively thin central web encircling the tube. Such web joins together the axial bars partially defining the rectangular openings and at the same time forms a barrier between axially parallel openings. After the tube has been completely perforated by said first tool, a second cutting tool shaves, at least partially, the faces of the axial bars and the face of the cage rims defining the openings and also removes the portions of the web separating each pair of aligned openings.

By such method, the central ring or web of material prevents the bars, which will define, in part, the windows, from springing away from their proper position during the initial cutting operation. It will also substantially eliminate the twisting of the bars. The resulting cage thus has windows with flat, straight sides which will provide proper guidance and be free of any tendency to create a pinching effect on the rollers.

In a modification of the aforesaid method, the windows are slightly tapered adjacent the ends thereof. Such modification also provides positive guidance contact between the rollers and bars adjacent the corners of the windows and freedom from such contact at the center sections thereof at the pitch circle of the rollers.

The principles of the invention and the best mode contemplated for applying such principles and carrying out the invention will more fully appear from the following description and accompanying drawings in illustration thereof.

In the drawings—

FIG. 1 is a perspective view of a tube with a thin walled center section;

FIG. 2 is a fragmentary cross-sectional view of the tube taken along the line 2—2 of FIG. 1;

FIG. 3 is a perspective view of a cutting tool and the tube illustrated in FIG. 1 after two pairs of rectangular openings have been cut in the tube in accordance with the invention;

FIG. 4 is a fragmentary cross-sectional view of the punched tube taken along the line 4—4 of FIG. 3;

FIG. 5 is a perspective view of the tube and a second cutting tool preparatory to its use on the tube, the tube having been fully perforated by the first cutting tool;

FIG. 6 is a cross-sectional view of the tube and second cutting tool as the tool is shaving the edges of a window;

FIG. 7 is a fragmentary, plan view, partly in cross-section, of the tube and second cutting tool taken along the line 7—7 of FIG. 6;

FIG. 8 is a fragmentary, cross-sectional view of a shaved window taken along the line 8—8 of FIG. 7;

FIG. 9 is a fragmentary view, taken from the longitudinal axis of the cage and looking outwardly, of a cage with rollers retained between the cage and an outer race (not shown);

FIG. 10 is an enlarged, cross-sectional view of the cage and rollers taken along the line 10—10 of FIG. 9;

FIG. 11 is a side view of an assembled roller bearing unit partly broken away to show the cage and roller bearing relationship;

FIG. 12 is a fragmentary cross-sectional view of the assembled roller bearing taken along the line 12—12 of FIG. 11;

FIG. 13 is a fragmentary, plan view illustrating a modified cage and assembled roller in which the end sections of the bars have been cut by a punch having sides tapering toward the ends of the windows.

Referring to the drawings, there is illustrated a tube 20 that has been severed from a longer tube and from which a cage for a roller bearing is to be made in accordance with the present invention. The tube 20 has a wall 21 of uniform thickness adjacent the ends 23, 24 of the tube 20 but having a thin, central ring 22 formed by reducing the thickness of the tube 20 on its outer surface. The ring 22 may be made in any suitable manner, such as by shaping the tube 20 in a lathe. To form the cage, the tube 20 is secured in a suitable fixture (not illustrated) and successive pairs of axially spaced, aligned openings 25, 26 are formed by a cutting tool or punch 27 as the tube is indexed on the fixture. The punch 27 is actuated by any suitable mechanism. The spaced openings 25, 26 are spaced from each other by a band or web 28 parallel to the cut edges 23, 24 of the tube 20 and transversely spaced from adjacent openings by bars 29 which are connected at their ends by spaced, parallel rim members 30, 31.

As illustrated in FIG. 3, the punch 27 is divided into two sections 32, 33 by a slot 34. The sections 32, 33 have straight, parallel front and back faces 40 and straight, parallel side faces 41. The shearing surfaces 42, 43 at the ends of the sections 32, 33 are preferably concave and inclined with respect to the side faces 41. The shearing surfaces 42, 43 are inclined with respect to the peripheral surface of the tube 20 so that when the leading edge of the shearing surface 43 first engages one end of the tube 20 all of the force of the punch can be directed to the initial cut to be made in the tube.

When the punch 27 completes its downward movement through the wall of the tube along the axial length of the punch it has created two spaced openings 25, 26 aligned with each other but spaced apart by the band or web 28. Such spaced openings have axial side faces 35, 36 which are parallel with each other and end faces 37, 38 which are parallel with each other, at least adjacent the outer peripheral surface of the tube. When the punch 27 makes additional rectangular openings in the tube 20, as the tube is indexed, the punch 27 leaves axial bars 29 separating successive pairs of spaced openings 25 and 26. Such bars 29 are joined at one end to the rim members 30, 31 and at the other to the web 28 which is parallel to the rim members 30, 31.

Referring to FIG. 3, it will be seen that when the punch 27 first strikes the tube 20 to form the first pair of spaced openings 25, 26 the force of the punch is resisted by large masses of material on either side of the openings to be formed. When the punch 27 cuts the second pair and succeeding pairs of spaced openings 25, 26 the resistance of the material on either side of the second and succeeding openings to be formed is substantially the same as the resistance to the first striking due to the rigidity of the band or web 28 which resists any springing or twisting of the bars 29. Consequently, the partially formed bars 29 do not yield under the pressure of the punch 27 and the upper portion 44 of the axial side face 36 and the corresponding portion of the opposite side face 35 of the spaced openings are straight and in parallel alignment with each other.

As indicated in FIG. 4, it is a characteristic of certain materials, such as steel, out of which the cage may be formed, to break away under the impact of the first punch leaving surfaces which are rough where the material has so broken away. That is to say, the punch 27 actually only cuts the outer peripheral surface of the wall of the tube 20 while the remainder of the wall thickness is broken away by the impact of the punch 27. Consequently only the upper portion 44 of the side face 36 is smooth whereas the lower portion 45 of the side face 36 (and the corresponding lower portion of the side face 35) is relatively rough and recessed away from the surface 44. It is likewise true that where the cage material breaks away after the cutting of the tube surface only the upper portions 46, 47 of the end faces 37, 38 will be smooth and the lower portions will be relatively rough and recessed away from the surfaces 46, 47.

While contact between a roller and the cage will ideally take place at the upper edge of the bar 29 adjacent the rims 30, 31, under certain conditions, such as loose fit, contact may be made with lower portions of the bar. To insure that a roller does not come into contact with possibly rough surfaces on the bar 29 it may be desirable to shave the side faces 35, 36 of the bar and the end faces 37. Such shaving if confined to the parts of the bar formed from the full wall thickness of the tube will leave a lip 62 which prevents the roller from dropping out of the cage during assembly of the roller bearing unit.

After the tube has been completely perforated (FIG. 5) by the first punch 27, and assuming that shaving of the faces 35, 36 and 37 is desirable, a cutting tool 50 is used to sequentially remove the connecting portions of the web 28 between the bars 29 and at the same time shave a portion of the faces 35, 36 and 37.

The cutting tool 50 includes a pilot portion 52 adapted to slide along one side 38 of the web 28 and along adjacent portions of the faces 35, 36 of the bars 29 so as to accurately guide the tool 50 as it moves into the spaces 25, 26. Bottom shearing surfaces 53, 54 are provided on the tool 50 which are inclined toward each other and which have leading edges 60, 61 which simultaneously engage the outer surface of the tube adjacent the portions 46 of the end faces 37. The distance between side faces 51 of the cutting tool 50 is slightly greater, a few thousandths of an inch, than the distance between the side faces 41 of the punch 27. Likewise, the distance between the front and back faces 56 is slightly greater than the distance between the faces 40 on the punch 27. Parallel front and back surfaces 56 are each formed with a depressed central section 58 of a width corresponding to the width of the ring 22. Such central section 58 has a depth equal to the depth or thickness of the punch 27 so that no shaving of the central section 57 of the bars 29 is affected as the cutting tool 50 moves into the openings 25, 26.

When the tool 50 descends into cutting position the pilot 52 enters one of the openings 25 (FIG. 6) so that one face of the pilot 52 abuts against an end face 38 of the opening 25 and the narrow sides of the pilot abut against the side faces 35, 36. In proceeding downwardly, the tool 50 shaves the side faces 35, 36 and end faces 37 preferably down to the area adjacent to the upper edge of the web 28 (FIG. 8). As the shaving operation is completed, the tool 50 continues downwardly with the inner portion of the inclined surface 54 engaging and removing that part of the web 28 lying between the bars 29. In so doing the tool 50 completes the window 59 in which a roller 63 may subsequently be inserted.

As illustrated in FIG. 7, in which two windows 59 have been formed and the tool 50 is in the process of forming a third window, the central section 57 of the bars 29 (which was formerly the ring 22) forms protuberances or lips 62 inasmuch as such section was not shaved by the tool 50. As may be clearing seen in FIG. 10, the distance between opposing lips 62 in a window 59 prevents the roller 63 from falling out of the completed cage 70 prior to the insertion of a shaft or inner race 72 in the roller bearing. An outer race ring 74 prevents the rollers from moving out of the cage 70 in that direction.

When the cage 70 is formed in the manner above described, the roller bearing is assembled by placing the cage in the outer race ring 74 and pressing the rollers 63 past the lips 62 into the windows 59. The bars 29 are sufficiently flexible to permit the rollers to pass the lips 62 and then spring back into place.

It is to be understood that the formation of the lips 62 can be dispensed with and the rollers retained in the cage 70 by swaging, staking or rolling the bottom of the bars or portions thereof. Alternately, all protuberances to retain the rollers in the cage can be eliminated if so desired by shaving the full length of the bars. In the latter case the rollers will be held in the cage after assembly by outer and inner raceways (FIG. 11) or by outer raceway and shaft. If the surfaces 35, 36 and 37 are satisfactorily smooth after the first cutting operation the second operation can consist merely in the removal of the web 28 between the bars 29.

The aforesaid method may be modified by providing front and back faces 56 on the punch 50 which taper toward the sides 57 so as to form tapered windows. As illustrated in FIG. 13, such windows eliminate any possible sharp edge contact between the rollers 63 and the points 64 on the edges of the bars 82 where the tube wall 21 is cut down to form the central ring 22. As will be observed, the modified window 81 has guide bars 82 which are not parallel to each other but are oblique thereto with the widest part of the bars 82 located adjacent the rim members 30, 31. Except for the shape of the punches, and the resulting shape of the windows, the modified cage 80 is produced in the same manner as that hereinbefore described. Such construction assures that the contact between the roller 63 and the bars 82 will take place adjacent to the corners of the rollers and adjacent to the corners of the windows 81 though the exact points of contact may vary slightly when random length rollers are used.

While the above method has been described as a two step operation, it is to be understood that the shaving sequence can take place independently of the cutting of the web without departing from the spirit of the invention.

Having described our invention we claim:

1. The method of forming a roller bearing cage from a tube comprising forming a central ring of reduced thickness in the outer surface portion of said tube, forming an annular array of axially spaced aligned pairs of openings in said tube partially straddling said ring so as to leave transverse interconnecting webs, formed by portions of the ring, between said pairs of openings and guide bars between successive openings, thereafter sequentially punching said tube with a tool having a pilot guided by one side of each connecting web for enlarging opposite portions of the aligned openings adjacent the tube ends to form narrowed guide bars, and removing the connecting webs for forming windows of pairs of said openings and retaining lips disposed radially inwardly on the guide bars at the central sections thereof.

2. The method of forming windows and a retainer in roller bearing cages which comprises thinning the wall thickness of the central section of a tube, sequentially forming pairs of annular spaced openings in said tube primarily in the portions having the greatest wall thickness, leaving longitudinal members of irregular cross section between said annular spaced members and a central transverse member between said longitudinal members, sequentially shaving those sections of the longitudinal members having the greatest cross section, and sequentially removing the portions of the transverse members between the longitudinal members to form windows being widest at the ends thereof and narrowest in the central portions of said windows, the narrow sections of said longitudinal members being adapted to prevent rollers from falling from said cage at one side thereof.

3. The method of forming a roller bearing cage from a tube comprising forming an annular array of axially spaced aligned pairs of openings in said tube so as to leave transverse interconnecting webs between said pairs of openings and guide bars between successive openings, thereafter sequentially punching said tube with a tool having a pilot guided by a wall defining in part one of said openings for enlarging spaced portions, of the aligned openings to form narrowed guide bars, and thereafter removing the connecting webs for forming windows of pairs of said openings.

4. The method of forming windows for roller bearing cages comprising punching a tubular member to form longitudinal bars that are irregular in cross section and integral interconnections extending between the bars and circumferentially whereby axially aligned, with each other, openings smaller than the desired windows are formed and thereafter removing said interconnections to form said windows, whereby variation in window size is substantially eliminated.

5. The method of forming windows in a roller bearing cage which comprises sequentially cutting a tube to substantially simultaneously form axially aligned, with each other, annular pairs of spaced openings having longitudinal bars extending the length of said openings and separated by transverse web members parallel to the edges of said tube extending between said openings and between said longitudinal bars and thereafter sequentially removing the webs between said bars to form windows of said aligned openings, whereby said web members substantially eliminate distortion of the longitudinal bars during formation of the windows.

6. The method of forming windows in a roller bearing cage which comprises sequentially cutting in a cage member an annular array of pairs of axially aligned, spaced from each other, openings separated by longitudinal bars extending along the length of the openings and also between the circumferentially spaced openings and a transverse web extending between the longitudinal bars and also between the axially aligned openings and thereafter shearing away the portions of the web extending between the bars to form windows that embrace said aligned, spaced openings, whereby said transverse web minimizes distortion of the longitudinal bars during formation of the windows.

7. The method of forming a cage from a tube including forming windows therein which comprises reducing the wall thickness of a tube about the central section thereof, sequentially forming an annular array of axially aligned, with each other, spaced openings in said tube partially straddling said central section with longitudinal members extending along the length of the openings and also between circumferentially spaced openings and transverse web members extending between said longitudinal members and parallel to the edges of the cage to form a ring, thereafter substantially simultaneously enlarging the remote end portions of said openings, and subsequently removing portions of said transverse members to form windows of said aligned openings.

8. The method of forming windows for a roller bearing cage which comprises forming in a member an array of axially aligned, with each other, spaced openings defined by longitudinal members extending along the length of the openings and also between the circumferentially spaced openings, by end members, and by transverse web members extending between the longitudinal members and also between axially aligned openings and said end members, and thereafter removing said transverse web members between said openings after cutting portions of the other members, whereby said transverse web members substantially eliminate the twisting and bowing of the longitudinal members resulting in the formation of substantially uniform windows.

References Cited in the file of this patent

UNITED STATES PATENTS

| | | |
|---|---|---|
| 2,223,768 | Martin | Dec. 3, 1940 |
| 2,342,340 | Hickling | Feb. 22, 1944 |
| 2,409,236 | Banker | Oct. 15, 1946 |
| 2,765,518 | Lovell | Oct. 9, 1956 |
| 2,846,902 | Cowley | Aug. 12, 1958 |
| 2,848,791 | Neese | Aug. 26, 1958 |
| 2,876,529 | Palmgren | Mar. 10, 1959 |

FOREIGN PATENTS

| | | |
|---|---|---|
| 478,189 | Great Britain | Jan. 13, 1938 |